H. FORD.
TRANSMISSION MECHANISM FOR TRACTORS.
APPLICATION FILED JULY 27, 1918.
1,347,690.
Patented July 27, 1920.
3 SHEETS—SHEET 2.
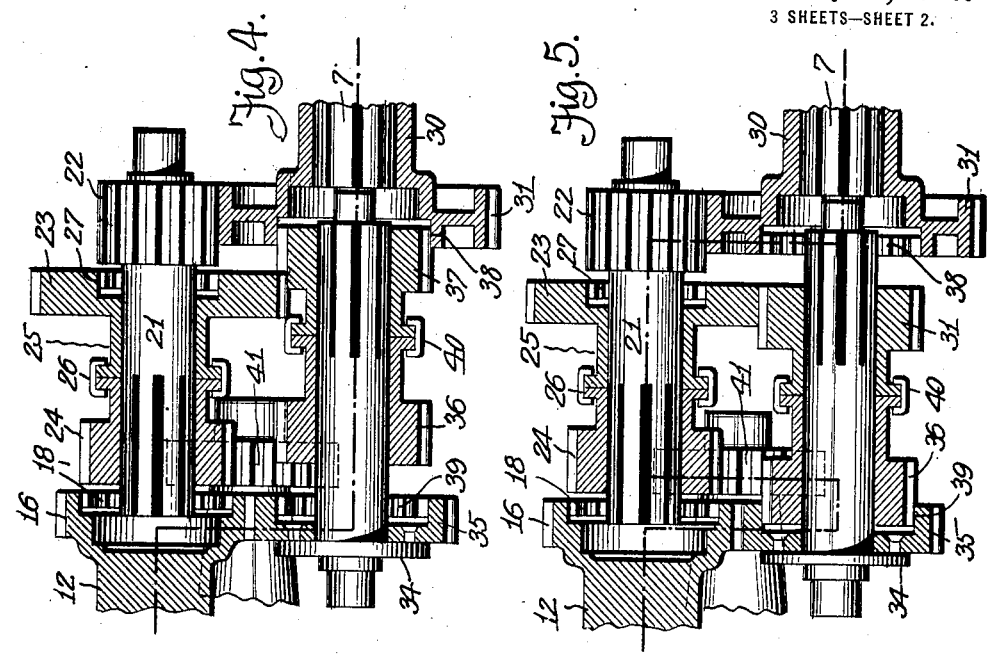
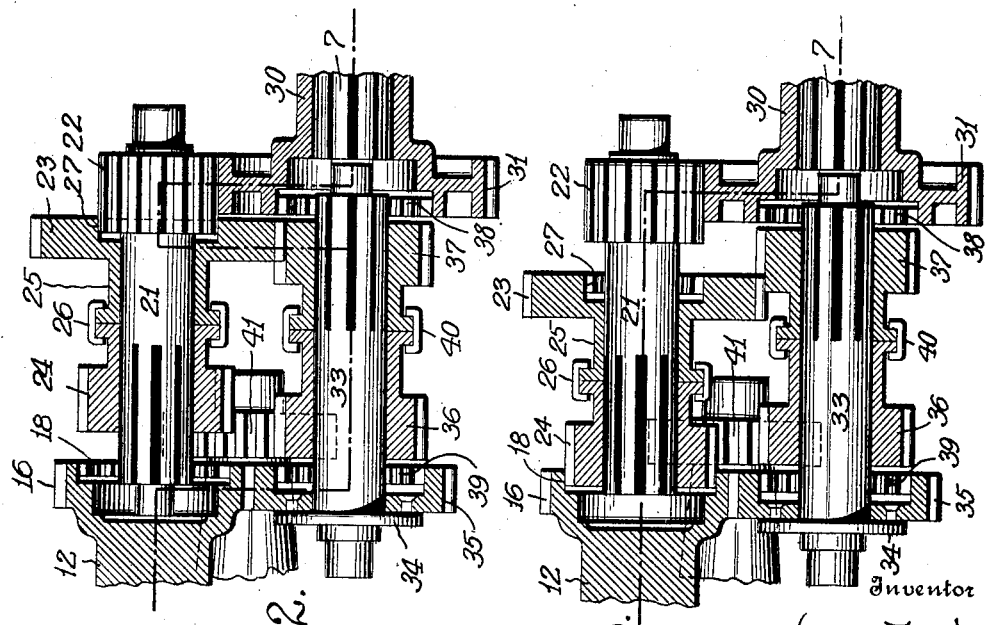
Witness
Chas. W. Stauffiger
Karl H. Butler
Inventor
Henry Ford,
By
Attorneys H. FORD.
TRANSMISSION MECHANISM FOR TRACTORS.
APPLICATION FILED JULY 27, 1918.
1,347,690.
Patented July 27, 1920.
3 SHEETS—SHEET 3.
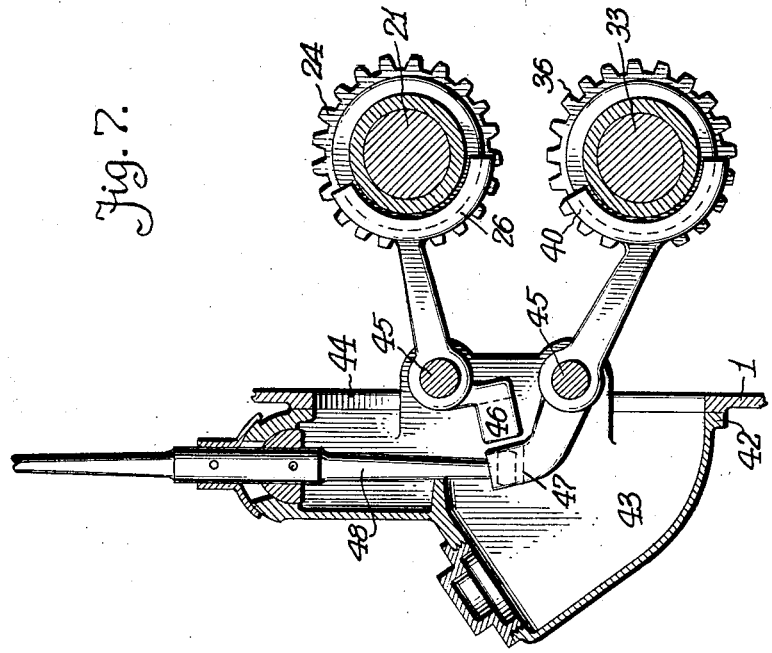
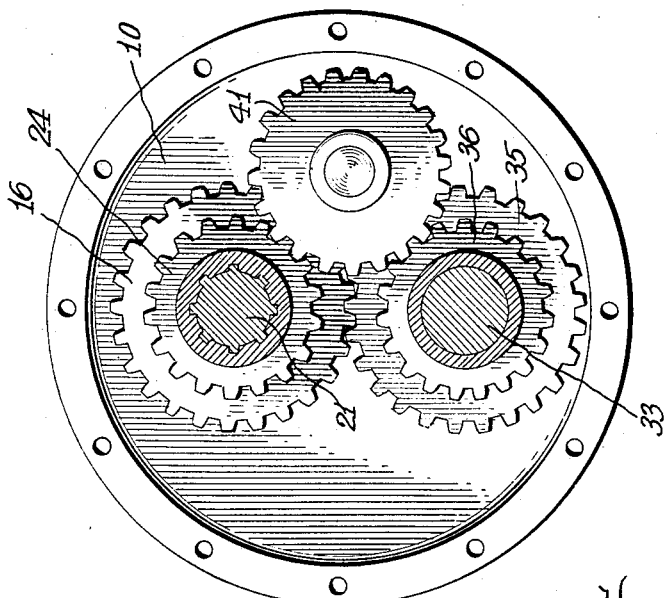
Witness
Chas. W. Stauffiger
Karl H. Butler
Inventor
Henry Ford,
By
Attorneys

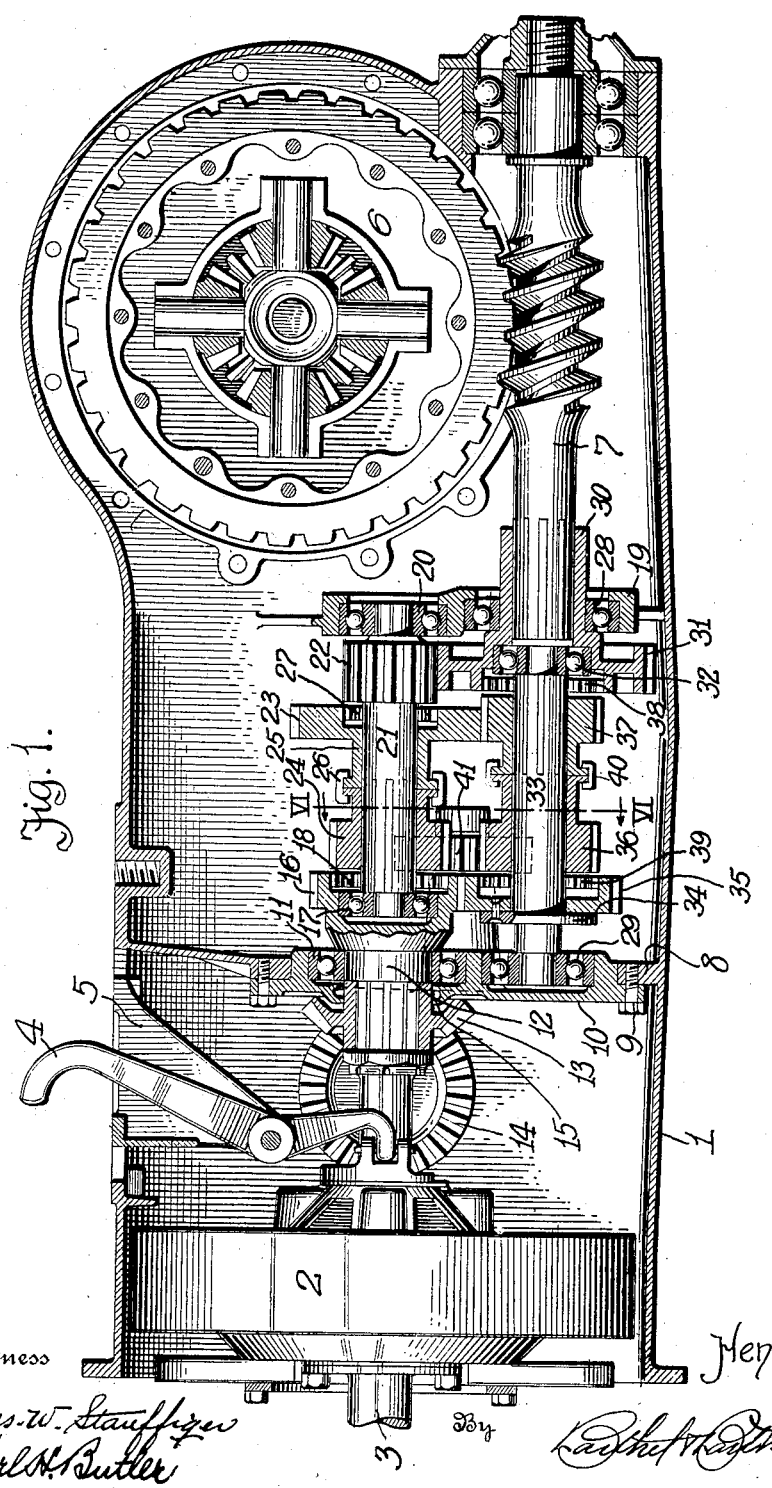

UNITED STATES PATENT OFFICE.

HENRY FORD, OF DEARBORN, MICHIGAN.

TRANSMISSION MECHANISM FOR TRACTORS.

1,347,690.          Specification of Letters Patent.      Patented July 27, 1920.

Application filed July 27, 1918. Serial No. 247,022.

*To all whom it may concern:*

Be it known that I, HENRY FORD, a citizen of the United States of America, residing at Dearborn, in the county of Wayne and State of Michigan, have invented certain new and useful Improvements in Transmission Mechanism for Tractors, of which the following is a specification, reference being had therein to the accompanying drawings.

This invention relates to transmission mechanism for tractors, and the mechanism is located between the engine and the rear axle of the tractor in order that the same may be moved at different speeds to suit various working conditions, and by which the tractor is reversed. The mechanism has been especially designed for a tractor having a transmission housing forming the greater part of the rear end thereof, and in which is located the clutch and worm drive of the tractor.

The transmission mechanism includes a novel arrangement of gear wheels by which high, low and intermediate speeds may be obtained, together with a reverse movement of the tractor, and provision is made so that parts of the transmission may be quickly disassembled for cleaning or repair.

My invention will be hereinafter described and then claimed, and reference will now be had to the drawings, wherein—

Figure 1 is a longitudinal sectional view of the transmission housing and the transmission mechanism therein;

Figs. 2 to 5 inclusive show longitudinal sectional views of the transmission mechanism in different positions and indicating by heavy dot and dash lines, the path of power transmitted in each position of the mechanism;

Fig. 6 is an enlarged cross sectional view taken on the line VI—VI of Fig. 1; and Fig. 7 is an enlarged cross sectional view of a portion of the mechanism, showing the gear shifters.

The transmission mechanism as now used is within a housing 1 that forms the rear part of a tractor, and is supported at its forward end by an engine and front axle and at its rear end by a rear axle. In the front end of the housing 1 is a clutch generally designated 2, and into which extends an engine shaft 3, said clutch being controlled by a clutch lever 4, carried by a bracket 5, within the housing 1.

In the rear end of the housing 1 is a differential mechanism, generally designated 6, and movement is imparted to said differential mechanism by a worm or driven shaft 7 journaled in the lower part of the housing 1.

In the housing 1, adjacent the clutch 2, is a transverse support 8 having an opening to receive a transmission plate 10, which is attached to the support 8 by screw bolts 9 or other fastening means. The upper part of the transmission plate 10 has an opening to receive the ball bearing 11, and a transmission drive shaft 12, said shaft having its forward end extending into the clutch 2 so as to have movement imparted thereto from the engine shaft 3, when the clutch 2 is thrown in to establish a driving relation.

On the drive shaft 12, in front of the plate 10, is a beveled gear wheel 13 meshing with a side beveled gear wheel 14 so that power may be transmitted to the outer side of the housing 1. The beveled gear wheel 14 is supported at the inner side of the housing 1 and is adapted for operating a pulley and thus permit of the power plant of the tractor being utilized for operating farm machinery while the tractor is stationary. This feature of the tractor has not been fully illustrated as the present invention is directed to the transmission mechanism *per se.*

Extending between the ball bearing 11 and the beveled gear wheel 13 is a dust guard or ring holder 15, and on the rear end of the drive shaft 12 is a gear wheel 16 provided with a concentric ball bearing 17 and an internal rack or clutch member 18.

In the housing 1, adjacent the differential mechanism 6 is a support 19 having the upper portions thereof provided with a ball bearing 20 for an upper transmission shaft 21, said shaft having its forward end supported by the ball bearing 17 within the gear wheel 16. On the upper transmission shaft 21, contiguous to the ball bearing 20, is a fixed gear wheel 22, and between this gear wheel and the gear wheel 16 are slidable gear wheels 23 and 24, the former being loose on the shaft 21 and the latter keyed to rotate with said shaft. The slidable gear wheels 23 and 24 have hub portions 25 loosely connected by an upper gear shifter 26 so that the gear wheels 23 and 24 may be simultaneously shifted along the upper transmission shaft 21, but free to revolve independent of each other. The gear wheel 24 is adapted to enter the gear wheel 16 and mesh or interlock with the internal rack 18 thereof, and the gear wheel 23 has an internal rack 27 adapted to mesh with the fixed gear wheel 22. As shown in Fig. 1, all of the gear wheels are in neutral position.

The lower part of the support 19 has a ball bearing 28 and the lower part of the transmission plate 10 has a ball bearing 29. Extending through the ball bearing 28 is the hub 30 of a worm shaft gear wheel 31, said gear wheel constantly meshing with the fixed gear wheel 22 on the upper transmission shaft 21. The hub 30 of the gear wheel 31 is fixed on and supports the forward end of the worm shaft 7, and in the worm wheel 31 is a ball bearing 32 which coöperates with the ball bearing 29 in supporting the ends of a lower transmission shaft 33.

The forward end of the lower transmission shaft 33 has a collar 34 and fixed to said collar is a gear wheel 35 which constantly meshes with the gear wheel 16 on the upper transmission shaft 21.

On the lower transmission shaft 33, between the gear wheels 35 and 31, are slidable gear wheels 36 and 37 constructed somewhat similar to the gear wheels 23 and 24 of the upper transmission shaft 21. The gear wheel 37 is keyed for rotation with the shaft 33, and said gear wheel constantly meshes with the gear wheel 23, but may be shifted into engagement with an internal rack 38, in the gear wheel 31. The gear wheel 36 is loose on the shaft 33 and may be shifted into engagement with an internal rack 39 in the gear wheel 35, the said gear wheels 36 and 37 having hub portions loosely connected by a lower gear shifter 40.

Meshing with the gear wheels 36 and 24 is a reverse idler gear wheel 41 rotatably supported by the transmission plate 10, and when said transmission plate is removed, the transmission drive shaft 12, lower transmission shaft 33 and reverse idler gear wheel 41 may go therewith, thus permitting all of the gear wheels of the transmission mechanism being cleaned, repaired or renewed.

On that side of the transmission housing 1, not shown in Fig. 1, is a gear shift plate 42, said plate having a housing 43 communicating with an opening 44 in the side wall of the transmission housing 1, as best shown in Fig. 7. The housing 43 has rods or shafts 45 for the gear shifters 26 and 40, said gear shifters having socket ends 46 and 47 respectively, adapted to receive the lower end of a gear shift lever 48 suitably supported by the top of the housing 43 for a rocking movement, so that the lower end of the lever may be shifted into either socket end of the gear shifters. The rods or shafts 45 are reciprocable relative to the housing 43 and in consequence of this arrangement and the mounting of the gear shift lever 48, either of the gear shifters 26 or 40 may be selected for longitudinal movement, and assuming that the various gear wheels are in neutral position as shown in Fig. 1, the following gear changes may be made.

For low speed the gear shift lever 48 is moved outward to the left from its neutral position, and pushed forward, thereby placing the internal rack 27 of the gear wheel 23 in engagement with the fixed gear wheel 22 of the upper transmission shaft 21. Power is then transmitted, as shown in Fig. 2, through the medium of the gear wheels 16 and 35, lower transmission shaft 33, gear wheels 37 and 23, internal rack 27 and gear wheels 22 and 31 to the worm shaft 7.

For intermediate speed, such as used for plowing, the gear shift lever 48 is moved outward to the left from its neutral position and pulled backward, thereby shifting the gear wheel 24 into engagement with the internal rack 18 of the gear wheel 16. Power is then transmitted as shown in Fig. 3, from the drive shaft 12 to the upper transmission shaft 21 and gear wheels 22 and 31 to the worm shaft 7.

To obtain a high speed, the gear shift lever 48 is moved inward to the right from its neutral position and pushed forward, thereby shifting the gear wheel 37 into engagement with the internal rack 38 of the gear wheel 31, as shown in Fig. 4. Power is then transmitted through the gear wheels 16 and 35 to the lower transmission shaft 33 and by gear wheel 37 and the internal rack 38 to the worm shaft 7.

For reverse movement, the lever 48 is shifted inward to the right from its neutral position and pulled backward, thereby placing the gear wheel 36, which constantly meshes with the idle gear wheel 41, in engagement with the internal rack 39. Power is then transmitted, as shown in Fig. 5, from the drive shaft 12 through the gear wheels 16 and 35 to the gear wheels 36, 41 and 24. Then from the upper transmission shaft 21 through the gear wheels 22 and 31 to the worm shaft 7.

In practice, it is always best to release the clutch 2 before engaging or disengaging the gear wheels, otherwise there may be a clashing of gears which will strip or break the ends of the gear teeth causing damage to the gear wheels and bearings.

From the foregoing it will be observed that the clutch, variable speed transmission mechanism, differential mechanism, and worm drive are all within one housing, and after the clutch is removed, by separating the forward and rear parts of the tractor, the transmission plate can be removed and easy access had to the various gear wheels.

Furthermore, that variable speeds are attained by a transmission mechanism that is comparatively short and compact. This is brought about, to a certain extent, by the internal racks and manner of interlocking the gear wheels, and while I have herein referred to internal racks as part of the gear wheel interlocking means, it is to be understood that clutch members or other intermeshing means may accomplish the same purpose, but not without manufacturing difficulties and expense. For instance, a gear wheel may be produced by a gear tooth cutting or trimming machine and be ready to serve both as a gear and a clutch member, thus obviating further machining, and it is only necessary to provide certain gear wheels with racks or toothed recesses to receive a portion or end of said gear wheel. It is also obvious the greater the number of contacting faces or interlocking parts the less chance there is for lost motion, and uncertainty of positively connecting the gear wheels.

What I claim is:—

1. The combination of a transmission housing, a worm shaft therein and parallel with the bottom of said housing, a clutch in said housing out of alinement with said worm shaft, and a transmission mechanism between said clutch and said worm shaft, said transmission mechanism including a plate detachably mounted in said housing between said clutch and said worm shaft and adapted when removed to carry with it a portion of said transmission mechanism.

2. A transmission mechanism comprising supports, a detachable transmission plate carried by one of said supports, a drive shaft supported by said transmission plate, a worm shaft extending into one of said supports, upper and lower transmission shafts between said supports, gear wheels supported by all of said shafts and adapted for various positions to transmit power from said drive shaft to said worm shaft at variable speeds, and a reverse idle gear wheel carried by said transmission plate and adapted to coöperate with the first mentioned gear wheels in imparting movement to said worm shaft.

3. A transmission mechanism comprising a drive shaft having a gear wheel, a driven shaft having a gear wheel, upper and lower transmission shafts, gear wheels fixed on said upper and lower transmission shafts and constantly meshing with the gear wheels of said drive and driven shafts, gear wheels slidable on the upper transmission shaft and adapted to alternately interlock with the gear wheel on said drive shaft and the fixed gear wheel on said upper transmission shaft, and gear wheels slidable on said lower transmission shaft adapted to alternately interlock with the gear wheel of said driven shaft and the fixed gear wheel of said lower transmission shaft.

4. A transmission mechanism comprising a drive shaft having a gear wheel, a driven shaft having a gear wheel, upper and lower transmission shafts, gear wheels fixed on said upper and lower transmission shafts and constantly meshing with the gear wheels of said drive and driven shafts, gear wheels slidable on the upper transmission shaft and adapted to alternately interlock with the gear wheel of said drive shaft and the fixed gear wheel of said upper transmission shaft, gear wheels slidable on said lower transmission shaft adapted to alternately interlock with the gear wheel of said driven shaft and the fixed gear wheel of said lower transmission shaft, and an idler gear wheel constantly meshing with one of the said slidable gear wheels of each transmission shaft.

In testimony whereof I affix my signature in presence of two witnesses.

HENRY FORD.

Witnesses:
 CHAS. E. SORENSEN,
 ERNEST KANDLER.